United States Patent [19]
Ackley

[11] Patent Number: 5,988,898
[45] Date of Patent: Nov. 23, 1999

[54] LABEL PRINTER HAVING INTEGRATED OPTICAL SCANNER MODULE

[75] Inventor: H. Sprague Ackley, Seattle, Wash.

[73] Assignee: Intermec IP Corp., Woodland Hills, Calif.

[21] Appl. No.: 09/013,116

[22] Filed: Jan. 26, 1998

[51] Int. Cl.⁶ .................................................. B41J 5/30
[52] U.S. Cl. .............................. 400/61; 400/70; 400/73; 400/76
[58] Field of Search ................................ 400/61, 73, 83, 400/70, 621, 76

[56] References Cited

U.S. PATENT DOCUMENTS

| | | |
|---|---|---|
| 3,169,186 | 2/1965 | Howard . |
| 3,671,720 | 6/1972 | White et al. . |
| 3,780,265 | 12/1973 | Lind . |
| 3,919,528 | 11/1975 | Cooper et al. . |
| 3,936,662 | 2/1976 | Rausing . |
| 3,990,044 | 11/1976 | Fahey et al. . |
| 4,029,945 | 6/1977 | Yamada et al. . |
| 5,294,783 | 3/1994 | Hammond, Jr. et al. ............... 235/462 |
| 5,381,487 | 1/1995 | Shamos ........................................ 382/2 |
| 5,393,147 | 2/1995 | Ueno et al. ................................ 400/65 |
| 5,401,110 | 3/1995 | Neely ....................................... 400/621 |
| 5,414,250 | 5/1995 | Swartz et al. . |
| 5,435,657 | 7/1995 | Pearce et al. ............................ 400/208 |
| 5,455,410 | 10/1995 | Schneider ................................ 235/385 |
| 5,477,042 | 12/1995 | Wang ....................................... 235/462 |
| 5,485,000 | 1/1996 | Schneider ................................ 235/494 |
| 5,513,459 | 5/1996 | Schneider .................................. 40/641 |
| 5,536,924 | 7/1996 | Ackley ..................................... 235/454 |
| 5,567,061 | 10/1996 | Nagata ....................................... 400/61 |
| 5,659,431 | 8/1997 | Ackley . |
| 5,720,154 | 2/1998 | Lasher et al. ............................. 53/411 |
| 5,841,116 | 11/1998 | Lewis ....................................... 235/375 |

FOREIGN PATENT DOCUMENTS

| | | |
|---|---|---|
| 2 683 062 | 4/1993 | France . |
| 2-212993 | 8/1990 | Japan . |

*Primary Examiner*—Stephen R. Funk
*Assistant Examiner*—Charles H. Nolan, Jr.
*Attorney, Agent, or Firm*—O'Melveny & Myers LLP

[57] ABSTRACT

A label printing device comprises a housing having a printer and a scanner disposed therein. The housing further includes a window permitting light to transmit therethrough to an optical sensing element of the scanner. The optical sensing element generates image data representative of a previously printed label brought into proximity with the window. A central processor controls the functions of the printer and the scanner. The central processor receives the image data generated by the optical sensing element and commands operation of the printer to print a label corresponding to the previously printed label.

28 Claims, 2 Drawing Sheets

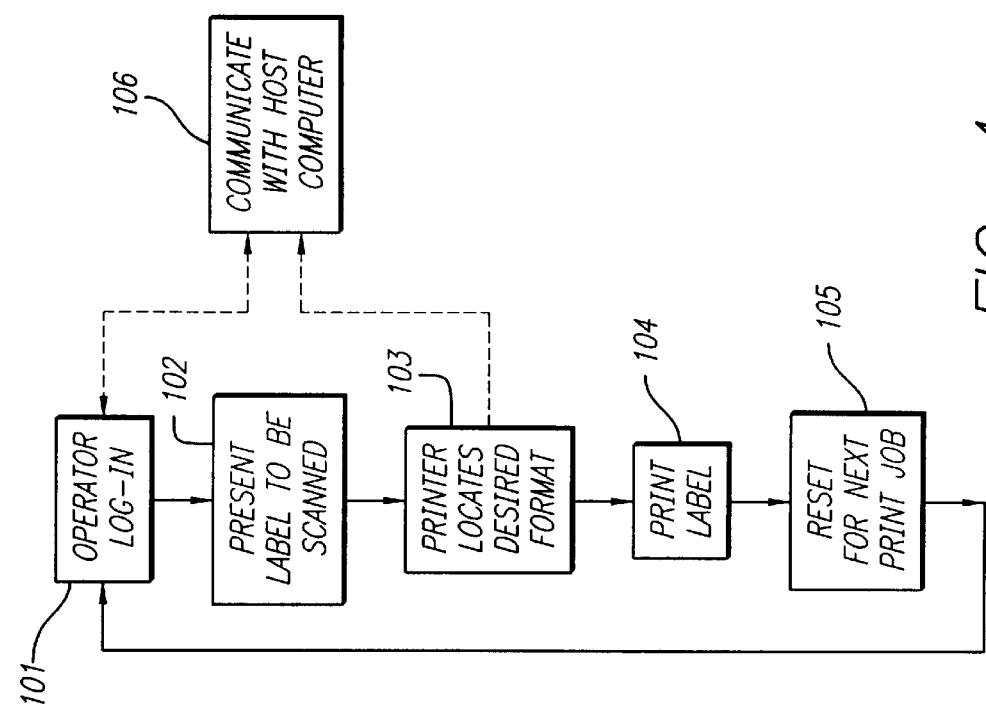
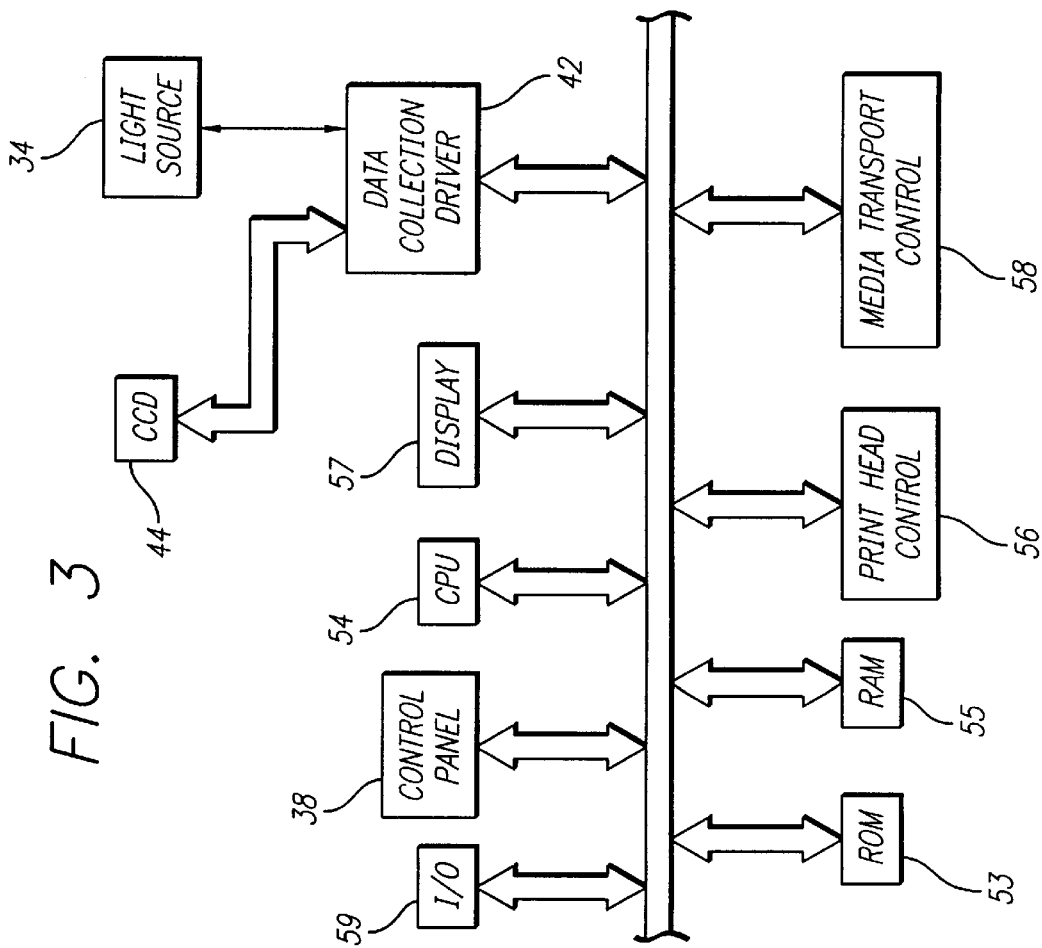

LABEL PRINTER HAVING INTEGRATED OPTICAL SCANNER MODULE

RELATED APPLICATION DATA

The present invention relates to co-pending application Ser. No. 08/872,949, filed Jun. 11, 1997, for GENERIC HANDHELD SYMBOLOGY SCANNER WITH A MODULAR OPTICAL SENSOR.

BACKGROUND OF THE INVENTION

1. Field of the Invention

The present invention relates to optical systems for reading one or two-dimensional bar code symbols, and more particularly, to a bar code label printer having an integrated optical scanner module that permits a desired bar code label to be scanned, identified and reproduced.

2. Description of Related Art

In the automated identification and data capture industry, it is known to use bar code symbology to encode alphanumeric information. A conventional bar code symbol represents a one-dimensional form of symbology, and comprises a pattern of vertical bars of various widths separated by spaces of various widths. Since the conventional one-dimensional symbols require a relatively large amount of space to convey a correspondingly small amount of data, two-dimensional bar code symbols have been developed. A two-dimensional symbol may comprise a matrix that occupies a uniform amount of space having a generally rectangular or square shape. Round or square dots disposed in particular rows and columns of the matrix correspond to the characters being conveyed. As a result, a two-dimensional matrix symbol can compress significantly more data into a given volume of space than a conventional one-dimensional bar code symbol. Examples of commercially available two-dimensional symbologies include Code One, Data Matrix and PDF417.

To read a bar code symbol, the bar code reader typically uses a light source, such as a laser, that is drawn across the bar code field. Since the black and white elements of the bar code symbol have different light reflecting characteristics, the reader can convert the symbol into an electrical signal by analyzing the light that has reflected from the symbol. The electrical signal can then be decoded to provide an alphanumeric representation of the symbol. Alternatively, the reader may include charge-coupled device (CCD) elements to form a memory-mapped image of a region of interest which includes an embedded one or two dimensional bar code symbol. The memory-mapped image may then be processed to locate, orient and decode the information that corresponds to the embedded bar code symbol.

In order for the bar code reader to accurately read the bar code symbol, it is essential that the symbol be printed in a high quality manner, without any streaking, blurring or improper registration to a label on which the symbol is printed. Since the bar code symbols are often printed on adhesive labels, it is essential that the adhesive backing layer of the labels not be damaged by heat generated during the printing process. In view of these demanding printing requirements, bar code symbols are often printed using direct thermal or thermal transfer printing techniques, referred to collectively herein as thermal printing.

The medical industry has made extensive use of automatic identification systems to improve the efficiency of medical care. Bar code labels are often used for tracking patient medical records in which a unique bar code symbol is used to identify each particular patient. To ensure correlation with the patient, all items pertaining to the patient, such as x-rays, test reports and specimens, may be affixed with a label bearing the patient's unique bar code symbol. It may be appreciated that this type of patient identification system increases the accuracy of medical care by preventing the patient's records from becoming mixed up, and enabling misplaced record items to be correlated to a particular patient's record.

Notwithstanding these advantages of automatic identification systems to the medical industry, they also present logistical problems to the medical support staff that must ensure that there is a ready supply of pre-printed labels having each patient's unique bar code symbol. For example, it often becomes necessary to reproduce (i.e., "clone") a bar code label that had been printed previously. Rather than using pre-printed labels, a medical office or facility may be provided with a thermal printer for printing additional bar code labels on demand. The thermal printer may be coupled to a computer, or a local area network (LAN) tying together several computers, that is accessible by an administrative member of the medical support staff to retrieve a patient's data record and instruct the printer to print a desired number of the labels. This can be a cumbersome and time consuming task that takes the medical support staff member away from the primary responsibility of providing medical care to the patients. Moreover, additional training is often required to teach the medical support staff to operate the computer system, which adds to the costs associated with operating such a system.

Thus, it would be very desirable to provide a fast and convenient system for operators of an automatic identification and data capture system to reproduce bar code labels on demand. It would be further desirable to provide a simple system that eliminates the need for cumbersome and time consuming interaction with computer systems to locate and retrieve stored data records, or extensive training to operate.

SUMMARY OF THE INVENTION

In accordance with the teachings of the present invention, a label printing system is provided which integrates the functions of a scanner and a printer together in a single device. To duplicate a desired bar code label, the label need only be presented to the scanner, whereupon the bar code label is identified and printed.

More particularly, a label printing device comprises a housing having a printer and a scanner disposed therein. The housing further includes a window permitting light to transmit therethrough to an optical sensing element of the scanner. The optical sensing element generates image data representative of a previously printed label brought into proximity with the window. A central processor controls the functions of the printer and the scanner. The central processor receives the image data generated by the optical sensing element and commands operation of the printer to print a label corresponding to the previously printed label.

In an embodiment of the invention, the label printing device further comprising a non-volatile memory containing stored instructions executable by the central processor. The stored instructions comprise the steps of: (1) activating operation of the scanner to generate the image data; (2) processing the image data provided by the scanner; (3) identifying a stored label format corresponding to the processed image data; and (4) activating operation of the printer to print a label in the identified format.

A more complete understanding of the label printer having an integrated optical scanner module will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 is a functional block diagram of the thermal printer and integrated optical scanner module; and FIG. 4 is a flow chart depicting operation of the thermal printer and integrated optical scanner module.

DETAILED DESCRIPTION OF THE PREFERRED EMBODIMENT

Figure 1:
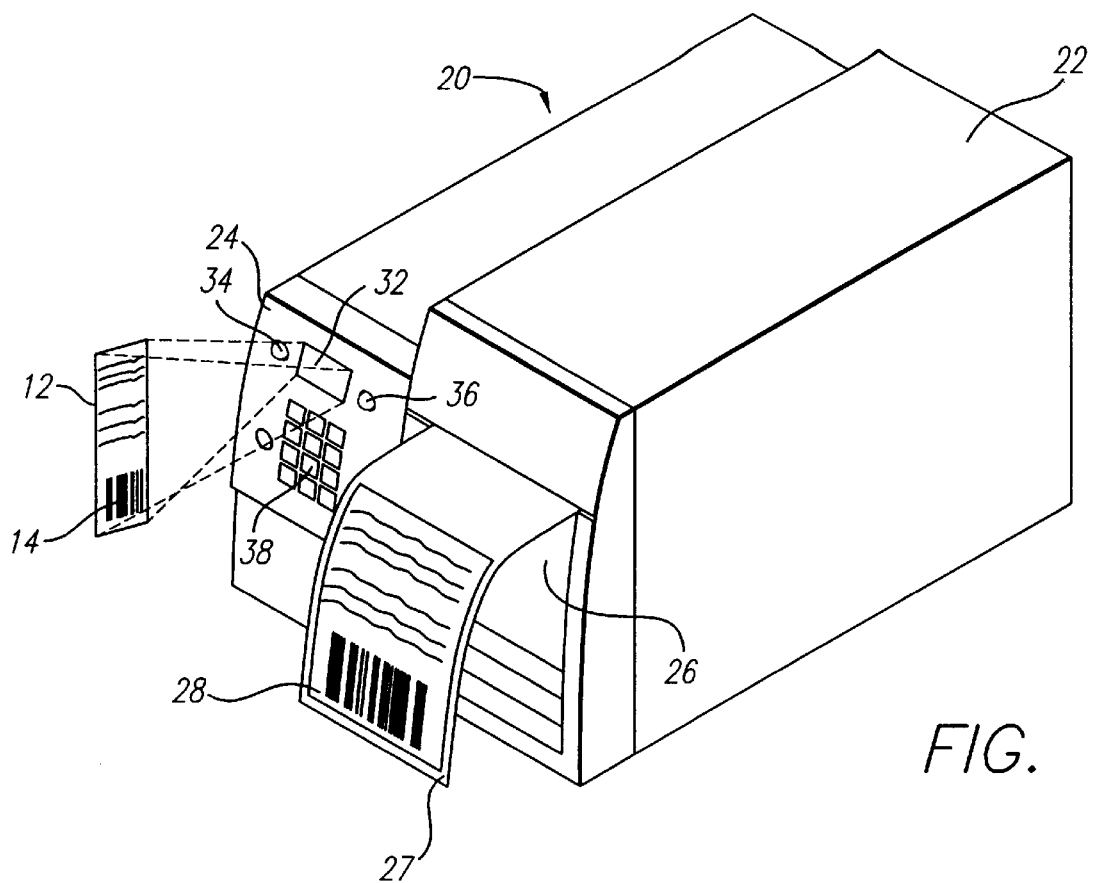
FIG. 1 is a perspective view of a label printer having an integrated optical scanner module of the present invention.

The present invention satisfies the need for a simple and convenient system for operators of automatic identification and data capture systems to print bar code labels on demand. In the detailed description that follows, it should be appreciated that like reference numerals are used to describe like elements illustrated in one or more of the figures.

Referring first to FIG. 1, a label printing device 20 of the present invention is illustrated. The label printing device 20 comprises a housing 22 which encloses the operative elements of the device, such as a transport mechanism used to transport print media to a thermal print head. As known in the art, the transport mechanism may further include a platen driven by a motor to draw a web of the print media past the thermal print head. The print media web is paid out from a media supply roll stowed internally within the label printing device 20 by operation of the transport mechanism, and printed media 28 thus exits the housing 22 via a media exit opening 26 disposed at a front portion of the device 20.

The printed media 28 comprises a plurality of individual labels each having a generally rectangular shape. The labels generally have an adhesive layer (not shown) and are affixed to an inert release liner 27. After the printed media 28 has exited the media exit opening 26, the label may be removed from the release liner 27 and affixed to an object of interest. Alternative forms of printed media may also be advantageously utilized, such as linerless media which does not utilize a release liner, or card stock which lacks an adhesive layer. Other shapes besides rectangular may also be advantageously utilized.

In a preferred embodiment of the invention, a thermal printer is utilized since thermal printing techniques provide generally favorable results in printing bar code labels; however, it should be appreciated that the present invention would be equally applicable to other well known types of printers, such as laser, ink jet or impact printers. It should be understood that further details of these conventional elements of a printing device otherwise not pertinent to the discussion of the present invention are omitted for simplicity, but would necessarily be included in an actual printing device.

A front panel 24 of the housing 22 includes a plurality of buttons that control operations of the printing device 20. A keypad 38 enables entry of alphanumeric information into the printing device 20. A window 32 is disposed on the front panel which permits reflect light to pass therethrough to an internal optical sensing element, as will be described below. The window 32 may comprise a transparent panel, such as comprised of glass or plastic, which provides protection for the optical sensing element. Alternatively, the window 32 may comprise an unprotected opening or slot in the front panel 24. A plurality of light sources 34, 36 are disposed adjacent to the window 32 to provide illumination for scanning operations, as will also be described below. The light sources 34, 36 may be provided by conventional light bulbs, light emitting diodes (LEDs) or laser diodes. The front panel 24 may also include a start/stop button that initiates and terminates individual printing operations, a reset button that clears the internal memory of the printing device 20, and/or a test button that initiates a test procedure of the printing device. It should be understood that the window 32 and light sources 34, 36 may also be disposed on other surfaces of the housing 22 of the printing device 20 besides the front panel 24.

It is anticipated that the printing device 20 be connected in a hardwired manner to a host computer or LAN that provides printing commands and data files. Other forms of electrical connection between the printing device 20 and the host computer or LAN are also contemplated, using alternative transmitting media including radio frequency (RF) and infrared (IR). In this manner, a data file sent from the host computer to the printing device 20 may cause the printing device to print a job comprising one or more labels.

As illustrated in FIG. 1, a previously printed label 12 is disposed in a position adjacent to the front panel 24 and facing the window 32. The label 12 represents an exemplary label used in an automatic identification system, such as a patient identifying label or card. The exemplary label 12 includes a one-dimensional bar code symbol 14 as well as other printed information, such as text, graphics, pictures or two-dimensional bar code symbols. Light from the light sources 34, 36 illuminate the label 12, and reflected light from the label is transmitted through the window 32. It should be appreciated that the label 12 may also be affixed to an object, such a patient's medical file or identification card, and is held in front of the window 32 by an operator of the printing device 20.

Figure 2:
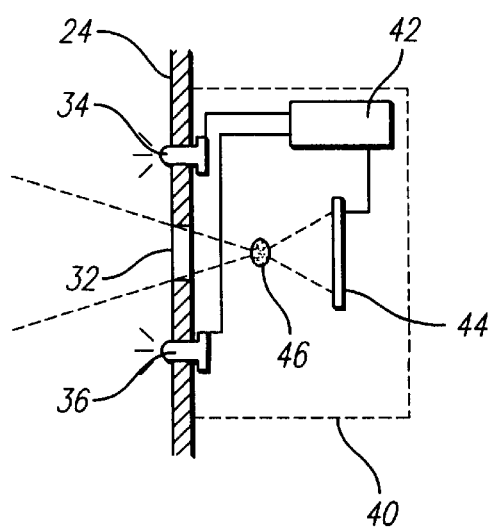
FIG. 2 is a partial sectional view of the integrated optical scanner module of FIG. 1.

Referring now to FIG. 2, a scanner module 40 of the printing device 20 is illustrated. The scanner module 40 includes a light sensing element 44, a lens 46 and a driver circuit 42. The sensing element 44 may comprise a charge coupled device (CCD) or other high speed, high density data storage medium capable of directly converting optical information into image data. As known in the art, a CCD comprises a one or two-dimensional array of photodiodes. The magnitude of electrical charge of each one of the photodiodes corresponds to a gray-scale level intensity of the light that is impinged thereon.

The sensing element 44 is substantially shielded from ambient sources of illumination by the front panel 24, with light being transmitted to the sensing element through the window 32. The lens 46 permits the transmitted light to be focused onto the surface of the sensing element 44. Alternatively, the lens 46 may be omitted, leaving a small diameter aperture, known as a "pin hole" aperture. The driver circuit 42 is electrically connected to the light sources 34, 36 and the sensing element 44, and controls operation of these elements, as will be further described below.

In an embodiment of the invention, the scanner module 40 may be of a type originally intended for use in a portable one or two-dimensional symbology imager that is adapted for use in the present printing device 20. A scanner module of this nature is disclosed in U.S. Pat. No. 5,536,924 for METHOD AND APPARATUS FOR MATRIX SYMBOL- OGY IMAGER, and U.S. Pat. No. 5,659,431 for FIXED MOUNT IMAGER USING OPTICAL MODULE FOR READING ONE OR TWO-DIMENSIONAL SYMBOLOGY DATA, both by the inventor herein, the subject matter of which is hereby incorporated in this application by reference. Moreover, the scanner module may comprise a removable modular unit that plugs into a slot in the printing device 20. The modular unit may include the window 32, light sources 34, 36 and a portion of the front panel 24. Removable modular optical units of this nature are disclosed in co-pending application Ser. No. 08/872,949 for GENERIC HANDHELD SYMBOLOGY SCANNER WITH A MODULAR OPTICAL SENSOR, by the inventor herein, the subject matter of which is also hereby incorporated in this application by reference.

A block diagram of the printing device 20 is shown in FIG. 3. The printing device 20 includes a central processing unit (CPU) 54, a read only memory (ROM) 53, a random access memory (RAM) 55, an input/output (I/O) device 59, a print head control circuit 56, a media transport control circuit 58, and a data collection driver 42. Each of the functional elements of the printing device 20 are coupled together by a bi-directional data and control bus over which data and control messages are transmitted. The CPU 54 controls the operation of the printing device 20, and may be provided by a conventional microprocessor, such as an Intel 80486 microprocessor, or a digital signal processor (DSP). The RAM 55 provides temporary data storage for operation of the CPU 54, and the ROM 53 provides for non-volatile storage of an instruction set, i.e., software, that is executed in a sequential manner by the CPU to control the overall operation of the printing device 20. The data collection driver 42 processes data signals from the CCD 44. The control panel 38 enables the operator to provide commands and other control information to the CPU 54. A display screen 57 may also be coupled to the CPU 54 for display of information, as known in the art.

The I/O device 59 controls communications between the printing device 20 and other external devices, such as a computer or local area network (LAN). The I/O device 59 may include a network driver permitting direct communication between the printing device 20 and the LAN for communication of commands and data. The media transport control circuit 58 provides signals to the various motors of the transport mechanism that effect the transport of the print media through the printing device 20. The print head control circuit 56 provides signals to the thermal print head to control parameters such as activation timing, duration and temperature of the individual printing elements.

A flow chart illustrating operation of the printing device 20 is provided in FIG. 4. In a preferred embodiment of the invention, the following steps are executed by the CPU 54 based on instructions stored non-volatile memory, such as ROM 53. It should also be appreciated that the steps may be executed by hardwired electrical circuits rather than using a programmable system, though programmable systems are preferred since they can be readily modified to accommodate desired changes in operation. The actual programming of the stored instructions can be accomplished in various manners, and is considered to be within the ability of an ordinary programming technician having routine skill in the art.

At step 101, an operator initiates a printing operation by logging into the computer system. The logging in operation ensures that only authorized personnel have access to the computer system. The operator may log in by entering codes into the keypad 38. Alternatively, the operator may have a badge or card having a bar code symbol printed thereon that is scanned by the scanner module 40. The printing device 20 then accesses an internal program or communicates with a host computer at step 106 to verify the authenticity of the operator.

Once the identity of the operator is verified, at step 102, the operator presents the label desired to be scanned to the scanner module 40. The data obtained by the scanner module 40 by scanning the label is used to identify the specific record (e.g., patient data record) which corresponds thereto. The printing device 20 may access the host computer to obtain the corresponding data record, and a data file may be transferred from the host computer to the printing device defining a print job. Alternatively, the data file may be stored locally within the printing device 20, such as within ROM 53, and is accessed without contacting the host computer. From either source, at step 103, the data file defines the characteristics of the print job, such as the format for the label and the information contained in the label.

Lastly, at step 104, the printing device 20 prints the desired label. The printing device 20 then resets for the next print job at step 105. This may include logging off of the operator from the system, and the system returns to step 101 to await log in by another operator. Alternatively, the printing device 20 may query the operator whether additional print jobs are required, and if so, the operator may remain logged in until which time the operator has completed all desired print jobs.

Having thus described a preferred embodiment of a label printing device having an integrated optical scanner, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A label printing system, comprising:
   a housing having a window;
   a printer disposed within said housing;
   a scanner disposed within said housing and comprising an optical sensing element adapted to receive light transmitted through said window, said optical sensing element generating image data corresponding to a coded symbol of an original label brought into proximity with said window; and
   a processor coupled to said printer and said scanner, said processor receiving said image data generated by said optical sensing element and commanding operation of said printer to print at least one replacement label in response to said image data, said at least one replacement label having a same label format as that of said original label.

2. The label printing system of claim 1, wherein said printer further comprises a print head and a media transport mechanism adapted to transport a print media to said print head for printing of information thereon, said print media being comprised of said at least one replacement label.

3. The label printing system of claim 1, wherein said at least one replacement label further comprises an adhesive surface.

4. The label printing system of claim 1, wherein said printer further comprises a thermal printer.

5. The label printing system of claim 1, wherein said optical sensing element further comprises a charge coupled device.

6. The label printing system of claim 1, wherein said processor is disposed within said housing.

7. The label printing system of claim 1, wherein said printing system is connected to an external computer for communication of data and commands therebetween.

8. The label printing system of claim 1, further comprising a light source disposed adjacent to said window and adapted to illuminate said original label disposed in proximity with said window.

9. The label printing system of claim 1, further comprising a non-volatile memory containing stored instructions executable by said processor, said processor being operative with said stored instructions to:

activate operation of said scanner;

process said image data provided by said scanner;

identify a stored label format corresponding to said processed image data; and activate operation of said printer.

10. The label printing system of claim 9, wherein said processor is further operative with said stored instructions to verify identity of an operator.

11. The label printing system of claim 9, wherein said processor is further operative with said stored instructions to:

communicate with a host computer; and retrieve a data file from said host computer, said data file providing said label format.

12. The label printing system of claim 1, wherein said window further comprises a transparent medium selected from one of glass and plastic.

13. The label printing system of claim 1, wherein said window further comprises an unprotected opening through said housing.

14. The label printing system of claim 1, further comprising a keypad disposed on said housing, said keypad permitting data communication with said processor.

15. The label printing system of claim 1, wherein said at least one replacement label comprises a substantially exact copy of said original label.

16. The label printing system of claim 1, wherein said coded symbol corresponds to a specific operator of said system, and said image data permits identity verification of said specific operator.

17. A label printing system, comprising:

a housing having a window;

a printer disposed within said housing;

scanning means for receiving light transmitted through said window and generating image data representative of a coded symbol of an original label brought into proximity with said window; and processing means for receiving said image data and commanding operation of said printer to print at least one replacement label in response to said image data, said at least one replacement label having a same label format as that of said original label.

18. The label printing system of claim 17, wherein said scanning means further comprises a charge coupled device.

19. The label printing system of claim 17, wherein said processing means is disposed within said housing.

20. The label printing system of claim 17, wherein said printing system is connected to an external computer for communication of commands and data therebetween.

21. The label printing system of claim 17, further comprising a non-volatile memory containing stored instructions executable by said processing means, said processor being operative with said stored instructions to:

activate operation of said scanning means;

process said image data provided by said scanning means;

identify said label format corresponding to said original label; and activate operation of said printer to print said replacement label in said label format.

22. The label printing system of claim 21, wherein said processor is further operative with said stored instructions to verify identity of an operator.

23. The label printing system of claim 21, wherein said processor is further operative with said stored instructions to:

communicate with a host computer; and retrieve a data file from said host computer, said data file providing said label format.

24. The label printing system of claim 17, wherein said coded symbol further comprises a two-dimensional bar code symbol.

25. The label printing system of claim 17, wherein said at least one replacement label comprises a substantially exact copy of said original label.

26. The label printing system of claim 17, wherein said coded symbol corresponds to a specific operator of said system, and said image data permits identity verification of said specific operator.

27. The label printing system of claim 1, wherein said scanner further comprises a removable modular unit.

28. The label printing system of claim 17, wherein said scanning means further comprises a removable modular unit.

* * * * *